United States Patent
Tyler et al.

(10) Patent No.: US 8,613,477 B2
(45) Date of Patent: Dec. 24, 2013

(54) MULTI-PIECE VEHICLE BED RAIL COVER

(75) Inventors: Robert D. Tyler, Winfield, KS (US);
Kenneth Douglas Johnson, Derby, KS (US)

(73) Assignee: Winfield Consumer Products, Inc., Winfield, KS (US)

( * ) Notice: Subject to any disclaimer, the term of this patent is extended or adjusted under 35 U.S.C. 154(b) by 0 days.

(21) Appl. No.: 13/590,344

(22) Filed: Aug. 21, 2012

(65) Prior Publication Data

US 2013/0099520 A1 Apr. 25, 2013

Related U.S. Application Data

(60) Provisional application No. 61/549,888, filed on Oct. 21, 2011.

(51) Int. Cl.
*B60R 13/01* (2006.01)

(52) U.S. Cl.
USPC .......................................... 296/39.1; 280/770

(58) Field of Classification Search
USPC .................... 296/39.1, 39.2, 41, 43; 280/770; 410/106, 108, 109, 110, 112
See application file for complete search history.

(56) References Cited

U.S. PATENT DOCUMENTS

| | | | | | |
|---|---|---|---|---|---|
| 5,360,250 | A | * | 11/1994 | Wood et al. | 296/39.2 |
| 5,364,211 | A | * | 11/1994 | Lund | 410/108 |
| 5,823,601 | A | * | 10/1998 | Stanesic et al. | 296/41 |
| 5,997,227 | A | * | 12/1999 | Bundy | 410/106 |
| 6,286,884 | B1 | * | 9/2001 | Speece | 296/41 |
| 7,845,887 | B2 | * | 12/2010 | Smith | 410/106 |
| 7,909,380 | B2 | * | 3/2011 | Fridrici et al. | 296/41 |

FOREIGN PATENT DOCUMENTS

JP       06298009 A  *  10/1994  ............. B60R 13/04

* cited by examiner

*Primary Examiner* — Lori Lyjak
(74) *Attorney, Agent, or Firm* — Westman, Champlin & Koehler, P.A.; Theodore M. Magee

(57) ABSTRACT

Multi-piece vehicle bed rail covers are disclosed. In one embodiment, a vehicle bed rail cover includes a first portion and a second portion. The first portion has at least one end that includes a raised feature, and the second portion has at least one end that is free from raised features. The first and the second portions are illustratively joined together in such a manner that a seam is concealed at least in part by the raised feature. The vehicle bed rail cover can also include additional raised features that may be perpendicular or angled with respect to a length of the bed rail cover. Furthermore, the vehicle bed rail cover may include one or more locking mechanisms to join the different portions together, and the vehicle bed rail cover may be made in part by utilizing injection molding.

20 Claims, 6 Drawing Sheets

MULTI-PIECE VEHICLE BED RAIL COVER

REFERENCE TO RELATED CASE

The present application claims the priority of provisional application Ser. No. 61/549,888 filed on Oct. 21, 2011, the content of which is hereby incorporated by reference in its entirety.

BACKGROUND

Pickup trucks as well as other motor vehicles typically have a truck bed for hauling items. A truck bed will typically have sides that are perpendicular to the bed, with a top surface called the bed rail. Bed rails may be protected using bed rail covers, commonly made for pickup trucks and other motor vehicles. Rail covers are available in the vehicle accessory market. One version of a rail cover is a single, elongated plastic component designed to be attached to a bed rail of a vehicle (usually a pickup truck). Of course, a separate bed rail cover will usually be attached to both bed rails of the vehicle. One purpose of the bed rail covers is to protect the paint finish on the vehicle bed rail. Some people also choose to install bed rail covers for an enhanced vehicle aesthetic appeal.

SUMMARY

An aspect of the disclosure relates to multi-piece vehicle bed rail covers. In one embodiment, a vehicle bed rail cover includes a first portion and a second portion. The first portion has at least one end that includes a raised feature, and the second portion has at least one end that is free from raised features. The first and the second portions are illustratively joined together in such a manner that a seam is concealed at least in part by the raised feature. The vehicle bed rail cover can also include additional raised features that may be perpendicular or angled with respect to a length of the bed rail cover. Furthermore, the vehicle bed rail cover may include one or more locking mechanisms to join the different portions together, and the vehicle bed rail cover may be made in part by utilizing injection molding.

These and various other features and advantages that characterize the claimed embodiments will become apparent upon reading the following detailed description and upon reviewing the associated drawings.

BRIEF DESCRIPTION OF THE DRAWINGS

FIGS. 2-1, 2-2, and 2-3 are top-down, side, and end views of a rear portion of a multi-piece bed rail cover.

FIGS. 3-1, 3-2, and 3-3 are top-down, side, and end views of a front portion of a multi-piece bed rail cover.

DETAILED DESCRIPTION

Figure 1:
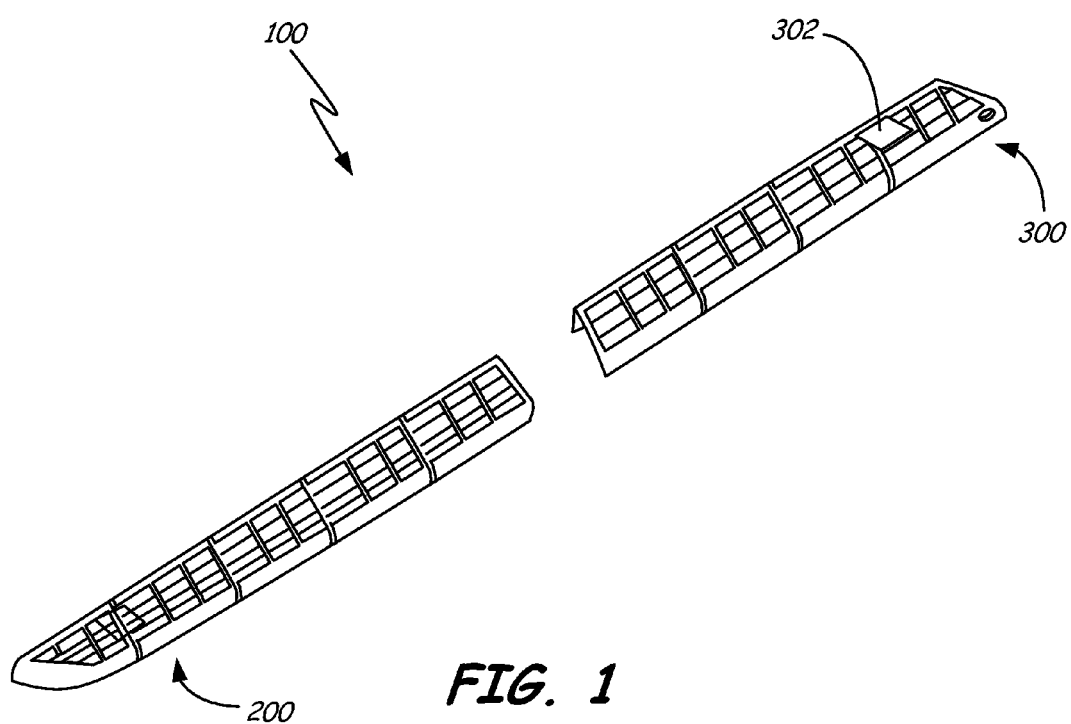
FIG. 1 is a perspective view of a multi-piece bed rail cover.

Embodiments of the present disclosure include multi-piece vehicle bed rail covers. Commonly when multiple pieces are put together, a visible seam is formed where the multiple pieces meet. People can see the seam and will be able to tell that the object is formed from multiple pieces and not one single piece. This may be undesirable in certain situations. For example, it may be undesirable for vehicle bed rail covers to be viewed as having multiple pieces. This may be especially true since vehicle bed rail covers may be used at times to enhance the aesthetics of a vehicle.

Certain embodiments of bed rail covers may include one or more features that are utilized to conceal the appearance of a seam where multiple pieces meet. The concealing features can include a raised feature such as, but not limited to a raised rib. For example, a multi-piece bed rail cover may include a series of raised ribs. One of the raised ribs can be placed where multiple pieces meet. Accordingly, people will not be able to visually perceive where the seam is, or for that matter, even tell that there is a seam at all. Instead, people will view the multi-piece bed rail cover as a single bed rail cover, which as mentioned above, can be more aesthetically pleasing.

Multi-piece bed rail covers may also provide additional benefits. For instance, there are challenges associated with the manufacture and commercial distribution of typical single-piece bed rail covers. Some of these challenges are related to the relatively large size of a bed rail cover. Even a small single-piece bed rail cover is likely to be at least five feet in length. In many cases, bed rail covers will be even longer than that. Thus, a bed rail cover is a relatively large and awkward product.

One disadvantage associated with the size and shape of a bed rail cover is that shipping can be relatively expensive. Many shipping companies incorporate package dimension as a parameter that affects what it costs to ship a product. Generally speaking, large (and especially long) products are often more expensive to ship than smaller products. This of course has a direct impact on the profit margin for the product.

Another disadvantage associated with the awkward size and shape of a typical bed rail cover is that the packaging in which the product is shipped is often especially susceptible to damage during the shipping process. Long boxes are generally more likely to get banged around and stacked upon during the shipping process. Smaller boxes are more likely to fit conveniently with other shipped packages and are therefore less susceptible to being damaged during shipping.

The large size of a single-piece bed rail cover and its associated packaging is also a disadvantage in that it takes up considerable space when stored as unsold or otherwise unshipped inventory. Bed rail cover products are often sold as automobile after-market accessories. It is common in this industry to stockpile inventory to some extent rather than manufacture products as they are ordered. The space utilized to store inventory costs money and is therefore another business expense that has an impact on the profit margin of the product. When a product takes up less space, it opens up more space for other products to be stored. When space is utilized efficiently, there is essentially a reduction in product cost.

Similarly, a typical bed rail cover is also likely to take up a significant amount of space in a show room, in a retail store, or in any other location where vehicle products are sold or otherwise shown to consumers, wholesale consumers, or any other product consumer. It is well known that sellers of products generally prefer to use display space as efficiently as possible. Thus, it can be difficult to convince sellers of products to carry bed rail caps in locations that are especially desirable in terms of drawing attention. When products are relatively small, there are more options in terms of display placement. When products are large, the options are often much more limited.

Embodiments of the present disclosure may reduce or eliminate at least some of the negative attributes of bed covers discussed above. For instance, shipping and storage costs of multi-piece bed rail covers may be less expensive due to the length of the bed rail covers being reduced. These and other benefits and advantages are discussed below. Additionally, it should be noted that embodiments are not limited to any particular benefit, advantage, or feature, and that embodiments may include any one or more features described below or shown in the figures.

FIG. 1 shows an example of one embodiment of a multi-piece bed rail cover 100. The front part 300 of the bed rail cover is shown on the right in FIG. 1. The back or rear part 200 is shown on the left. The front part is illustratively the part that is installed on the top of a bed rail in a location closest to the vehicle cab. The back or rear portion is illustratively installed on top of the bed rail in a location closer to a tailgate of a vehicle. This is not to say that embodiments of the present invention are limited to being installed on bed rails associated with vehicles that have a cab and tailgate, however, vehicles that have a cab and tailgate are commonly associated with bed rails upon which bed rail covers are applied.

Figures 1, 2:
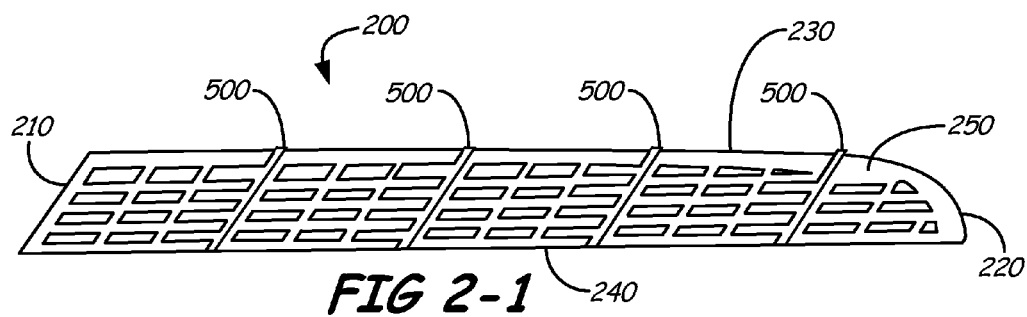
Figure 2:
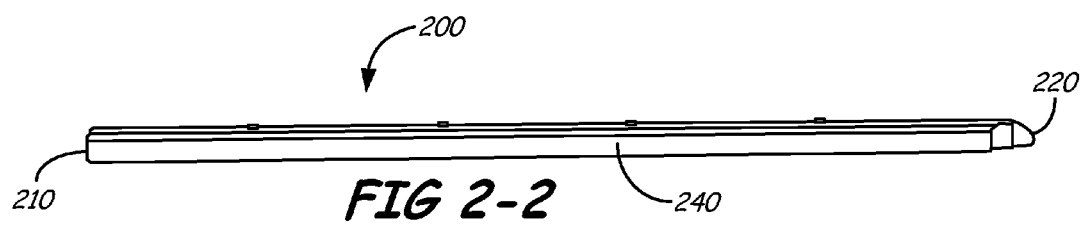
Figures 2, 3:
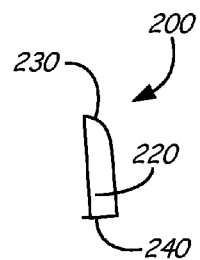
Figures 1, 3:
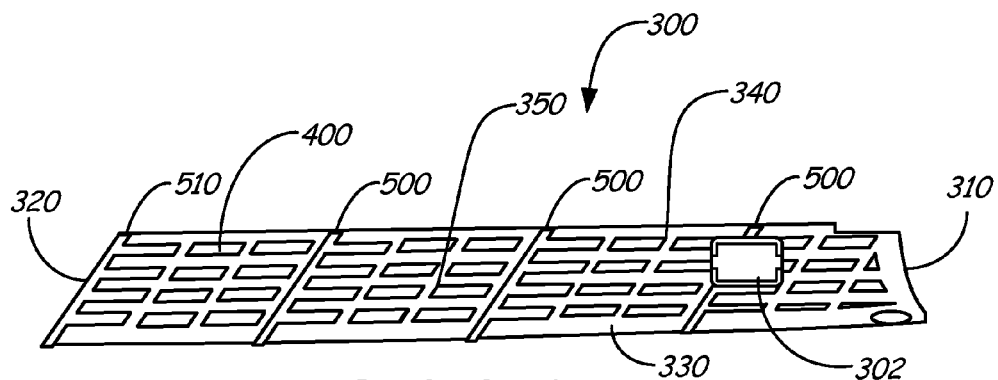
Figures 2, 3:
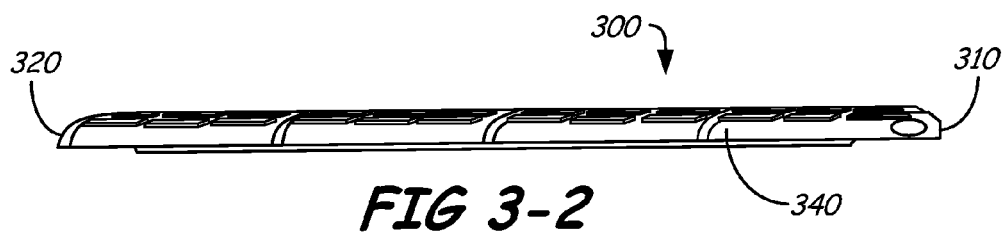
Figure 3:
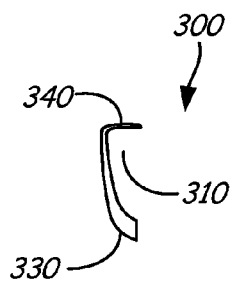

FIGS. 2-1, 2-2, and 2-3 show additional views of the rear portion 200 of the bed rail cover (i.e. the portion shown on the left in FIG. 1). FIG. 2-1 is a top-down view. FIG. 2-2 is a side view, and FIG. 2-3 is an end view. The front surface 210, rear surface 220, outboard surface 230, inboard surface 240, and top surface 250 of the rear bed rail cover are shown. A tread pattern 400 and ribs 500 are also shown.

FIGS. 3-1, 3-2, and 3-3 show additional views of the front portion 300 of the bed rail cover (the portion of the bed rail covers shown on the right in FIG. 1). FIG. 3-1 is a top-down view. FIG. 3-2 is a side view, and FIG. 3-3 is an end view. FIG. 3-1 shows more clearly an opening 302 for a posthole cap. Those skilled in the art will appreciate that this opening will illustratively correspond to a posthole opening in a vehicle bed rail. A cap can be installed within the bed rail opening 302 if it is desired to conceal the opening and therefore conceal the vehicle posthole. The front surface 310, rear surface 320, outboard surface 330, inboard surface 340, and top surface 350 of the front bed rail cover are shown. Tread pattern 400 and ribs 500 are shown. The rib 510 at the rear surface 320 is used to conceal the seam created when the front cover 300 abuts the rear cover 200.

Figure 4:
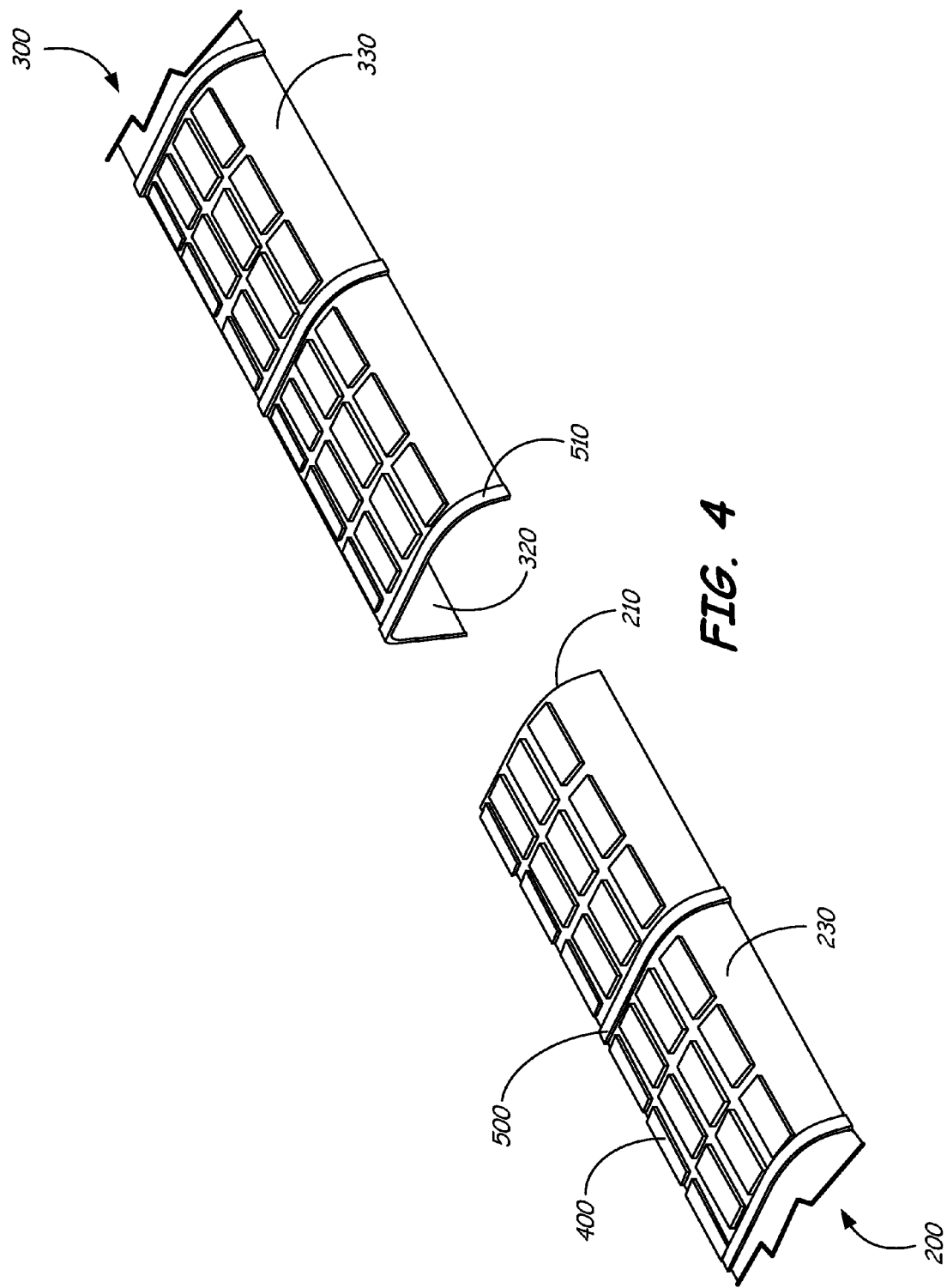
FIG. 4 is a perspective view of a front and a rear portion of a multi-piece bed rail cover being joined together.

FIG. 4 shows an example of a close-up view of where the front portion 300 and rear portion 200 of the bed rail cover come together in an abutting fashion when installed upon a vehicle bed rail. FIG. 4 shows how the rear portion 200 of the bed rail cover has an end that is slightly tucked under a raised rib 510 in the end of the front portion 300 so as to create the appearance of one integrally formed bed rail cover 100. In other words, a small portion of the front portion overlaps a portion of the back portion when the bed rail cover is installed. This may be accomplished at least in part by the end of the back portion being free from any raised features (e.g. free from raised ribs).

As is shown in the figures, the bed rail cover includes a tread pattern 400 comprising a set of rectangles oriented such that the side with the longest lengths is in line with the longest length of the bed rail cover. Then, the bed rail cover includes a set of periodic raised ribs 500 that are generally perpendicular to the longest length of the bed rail cover. It is under one of these raised ribs 510 on the rear edge 320 of the front portion that the rear end of the bed rail cover is tucked in order to give the multi-piece bed rail cover the aesthetic appearance of a single, integrally formed bed rail cover. In other words, the raised rib 510 on the rear end 320 of the front portion 300 of the bed rail cover is utilized to conceal a seam where the front 300 and rear 200 portions are brought together in a generally abutting fashion. The seal-concealing perpendicular rib 510 looks substantially similar to the other perpendicular ribs 500 utilized to divide up the rectangles in the tread pattern. However, the perpendicular rib 510 in the case of the one end 320 of the front portion doubles as a mechanism for hiding the seam. Those skilled in the art will appreciate that the scope of the present invention is not limited to a two-part bed rail cover. A similar seam-concealing scheme could be utilized just as easily to implement a three or more piece bed rail cover.

With further reference to FIG. 4, it is worth pointing out that the raised rib 510 that covers the seam between the two bed rail cover portions 200 and 300 generally extends from one side (e.g. the vehicle outboard sides 230 and 330 of the covers when installed) of the bed rail cover but not all the way to the other side (e.g. the vehicle inboard sides 240 and 340 of the covers when installed). The flat side of the bed rail cover is illustratively the side that creates the inboard surfaces 240 and 340 of the rear and front bed rail covers, respectively, when the cover is installed. In FIG. 4, the raised rib does not extend down this flat side. In one embodiment, this is by design in order to form a completely flat surface along the inboard surfaces 240 and 340 of the bed rail cover when the cover is installed. However, it is within the scope of the present invention for the raised rib to extend all the way down the flat sides 240 and 340, which would make the flat side of the bed rail have a "bump" in it where the raised rib 510 causes an interruption in the otherwise elongated flat surface. It should be noted that it is within the scope of the present invention for the raised rib 510 to extend across any or all of the short length of the bed rail cover 100. In other words, the scope of the present invention is not limited to the illustrated case. The raised rib 510 can be a single continuous rib or multiple, inline rib portions sharing the same center of axis. Also, all of these variations in terms of how the rib 510 extends between the inboard and outboard sides of the bed rail cover are applicable to the seam concealing rib 510 but are also applicable to any of the other periodic raised ribs 500 included along the cover 100.

Figure 6:
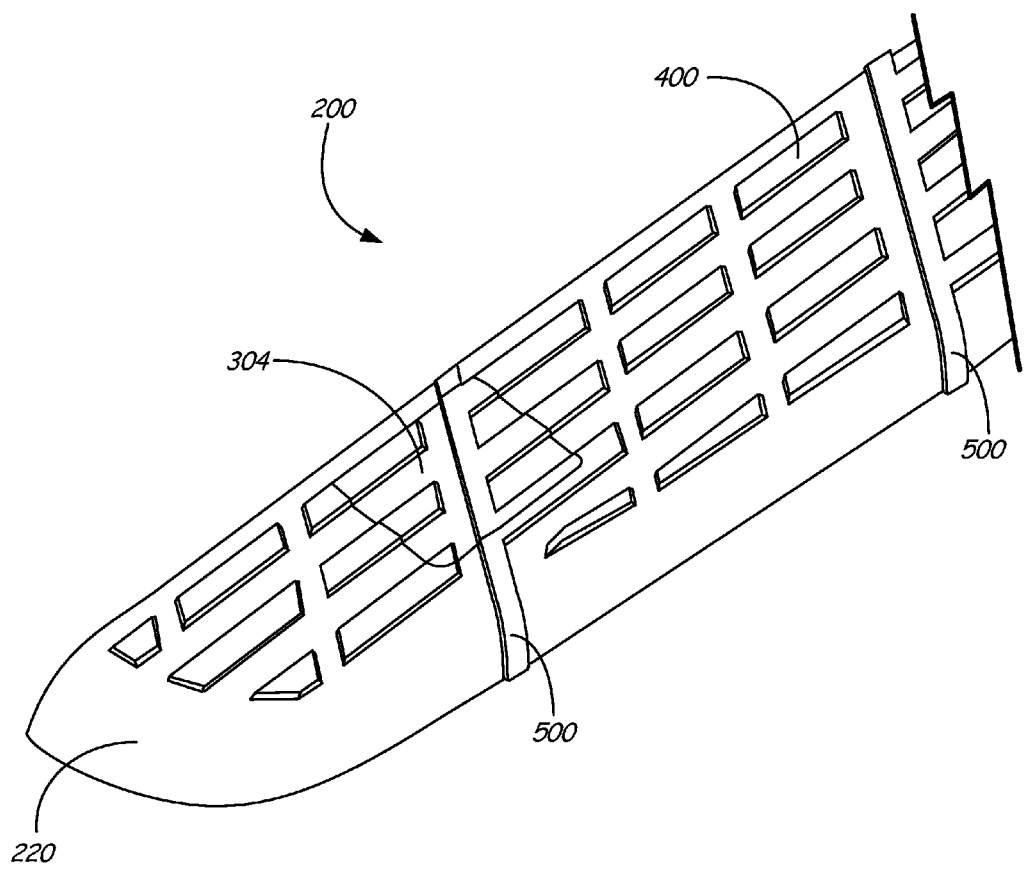
FIG. 6 is a perspective view of a posthole aperture with a posthole cap in place of a multi-piece bed rail cover.

It should also be noted that the raised ribs 500 need not necessarily be at a right angle relative to the longest length of the bed rail cover 100. This right angle configuration is shown in FIG. 4. However, the configuration shown in FIG. 6 demonstrates how the raised ribs 500 can be oriented at an angle other than 90 degrees (e.g. the seam covering element 510 can be formed at an angle). Notably, the tread components 400 between the raised ribs 500 in FIG. 4 are generally rectangle shaped (though they could just as easily be square shaped, diamond, or any other shape) and the tread components 400 between the raised ribs 500 in FIG. 6 are parallelogram shaped or otherwise shaped. All shape variations, including circle shaped, should be considered within the scope of the present invention. In one embodiment, the tread components 400 can be formed as raised words or symbols such as a vehicle brand logo or indicia of a favorite sports team.

Figure 5:
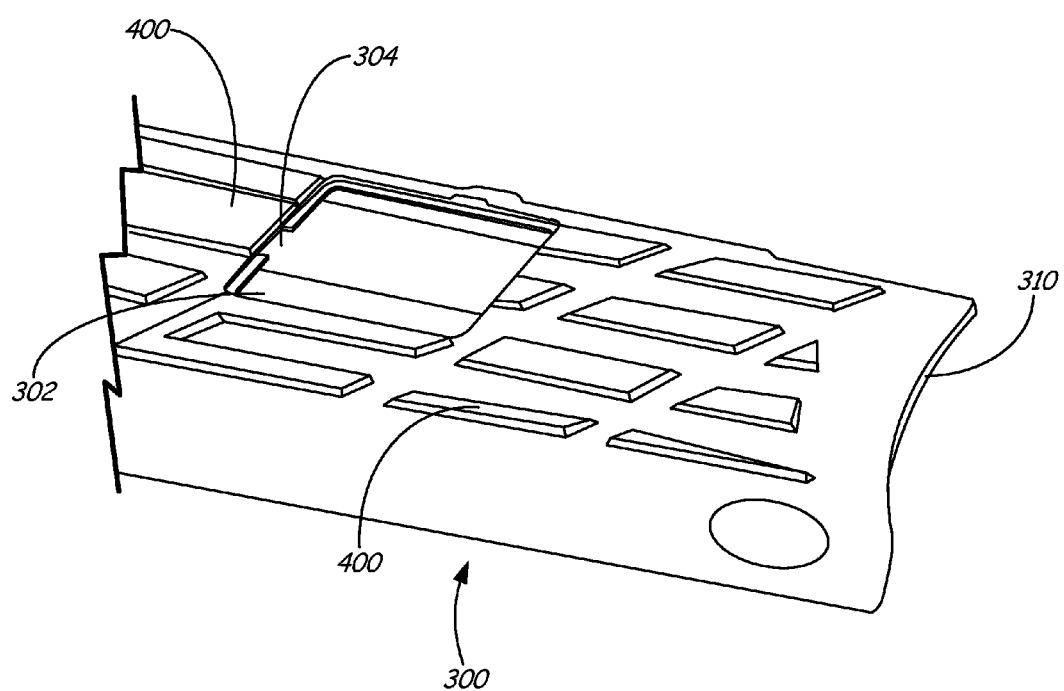
FIG. 5 is a perspective view of a posthole aperture in a front portion of a multi-piece bed rail cover.

FIG. 5 is a more detailed illustration of the front end 310 of the front portion 300 of the bed rail cover 100. The illustrated front end 310 of the front portion 300 is the end opposite the raised rib 510. Posthole opening 302 and posthole opening cover 304 are shown.

FIG. 6 is a more detailed illustration of the rear end 220 of the rear portion 200 of the bed rail cover 100. The illustrated rear end 200 of the rear portion 200 is the end opposite the end that tucks under the front portion 300 when the bed rail cover 100 is installed. The FIG. 6 illustration more clearly shows a posthole cap 304 placed into another posthole opening 302 that illustratively correspond to a posthole opening in the vehicle bed rail. As is shown, the insert mimics the ribs 500 and tread 400 and the exterior surface of the bed rail cover 100. It is within the scope of the present invention to have any number and configuration of posthole openings 302 and posthole opening caps 304 formed in the bed rail cover 100. It is illustratively true that the number of openings in the bed rail cover will ideally correspond to the number of posthole openings in a given vehicle bed rail, though other configurations are within the scope of this invention.

It is to be understood that the scope of the present invention is not limited to utilizing a concealing rib per se in order to conceal the seam between the multiple parts. It is within the scope of the present invention for any raised feature to overlap in manner so as to conceal the seam. However, one particular aspect of the present invention pertains to incorporation of a periodic raised feature that appears multiple times in the surface of the cover but does not always cover a seam between cover portions. In other words, by utilizing one or more components of a periodic pattern as the seam covering mechanism, the impression is given that the elongated bed rail cover 100 is all one continuous piece. The seam-covering feature appears as if it is the same as the other raised features that are not covering seams. The outward appearance of the bed rail cover generally has no obvious indication or appearance of a joint between multiple portions. However, it is within the scope of the present invention for at least a small portion of the seam to appear such as on the inboard sides 240 and 340 of the rear and front rail covers, respectively, in an area where the raised concealing element does not extend.

In one embodiment, the seam-covering element is essentially identical to the corresponding, aesthetically similar periodic elements in terms of size, shape, etc. However, the pattern incorporated into the top surfaces 250 and 350 of the rear and front bed rail covers, respectively, need not necessarily be symmetrical or periodically continuous. It is also within the scope of the invention to cover the seam in a visually obvious manner (e.g. a clear raised joint where the seam is concealed). It is also within the scope of the present invention to otherwise be rather clever about aesthetically hiding the fact that there is a concealed seam. For example, a seam can perhaps be hidden in a more complex (e.g. not strictly periodic) raised rib patter such as under the middle of the three grouped ribs in the following pattern:

/ / / /// / / /

Of course, this is but one of many possibilities within the scope of the present invention. Another options is to hide the seam under a raised rib 510 within one of the following pattern:

\ / \ / \ / \

And, again, the scope of the present invention is not even limited to raised ribs 500. Other shapes and configurations are certainly conceived of as possibilities within the scope of the present invention.

In one embodiment, the height (i.e. how far of an extension from the primary surface of the cover surface compared to other features also raised or otherwise extending out from the primary surface) of a raised rib 510 or other seam concealing feature is at least slightly greater or less than the height of raised ribs 500 or other raised features that are not covering a seam. In another embodiment, the height is the same regardless of whether concealing or not concealing a seam. In one embodiment, the end of the portion that tucks under a seam concealing feature is formed so as to be slightly thinned (e.g. tapered) or thickened so as to accommodate the tucked under arrangement while maintaining a desired total thickness of the two cover portions 200 and 300 at the point of overlap.

In one embodiment (not shown), the ends of the two adjoining portions are formed so as to include a cooperative locking or attaching mechanism for securing the two portions together. In one embodiment, this is a tongue and groove arrangement where a tongue on one of the portions secures within a groove formed on the other corresponding portion. Other locking mechanisms, including those that involve a piece separate from the multiple adjoining portions, should also be considered within the scope of the present invention.

The described embodiments of a bed rail cover with multiple portions effectively shrinks the amount of inventory storage, packaging and display space needed required for a bed rail cover product. This is because the multiple pieces are illustratively configured to be overlapped with each other when stored, packaged, sold, displayed, etc. This overlapping therefore enables lower shipping and storage costs and opens up more possibilities for effective product display to potential purchasers.

Another significant advantage of the multi-piece design is that it enables substantial benefits related to manufacturing efficiency and flexibility. In one embodiment, each of the multiple parts of the bed rail cover are manufactured via injection molding. In accordance with one aspect of the present invention, the back or rear portion of the bed rail cover (e.g. shown in FIG. 2 and the left hand side of FIG. 1) is relatively modular in that it is designed so as to be appropriate for a suitably tight fit upon a rear portion of a set of multiple vehicle bed rails in the current market despite the fact that the corresponding front end portions of the set of multiple vehicle bed rails vary so much as to require different front portion bed rail cover designs. Thus, the multiple part bed rail cover design provides the bed rail cover manufacturer the otherwise unobtainable option of efficiently producing (without comparatively fewer stops for changes in molding machine set up) an inventory of back end cover portions that will be combinable with different front portions for different vehicle bed rail designs. While the front end portions might be specific to just one vehicle, the back end portion illustratively accommodates multiple vehicles and therefore can be more aggressively produced and stored in inventory if the manufacturer so chooses. The manufacturer gains the ability to efficiently produce and stock pile an inventory of back end pieces without having to stock pile a separate front end piece for every produced back end piece. The manufacturer gains many new options for producing and stockpiling inventory.

Those skilled in the art will observe that molds may be utilized to create many if not all of the embodiments described herein. Furthermore, efficient mold design may allow for two different versions of the rear portion of the multiple part bed rail cover to be produced from essentially just one mold. More particularly, a single mold with an insert that can be switched out may be utilized to produce two different lengths of the rear end portion. In other words, the mold utilized to form the rear end portion of the cover may include removable portions that are replaced with a blank when it is desired to generate a shorter version of the rear end portion. When the blank is in place, the mold will facilitate creation of the shorter version of the rear portion. When the blank is out and the mold extension piece is in place, the mold will enable generation of the longer version of the rear end portion. Accordingly, one mold essentially facilitates creation of two different versions of the rear end portion. This also gives the manufacturer additional options in terms of creating variable amounts of inventory in order to minimize storage time and maximize the likelihood of quickly getting a product to a consumer.

It is also worth noting that still another benefit of the multiple part bed rail embodiments described herein is that the portions of the bed rail cover can be formed in smaller injection molding machinery than is required to generate the longer continuous cover designs. The machinery for generating larger injection molded pieces is generally more expensive and more costly to run than machines that generate smaller pieces. In fact, it is almost always true that equipment configured to generate larger pieces is more expensive for purchase, for rent, or for hiring out production than equipment utilized to manufacturer smaller pieces.

The designs described herein empower the manufacturer to utilize smaller tools to cover more cover models. Further, fewer molds are needed in total. This reduces tooling costs, yet another benefit of the multiple part design.

It should be noted that features attributed herein to one or the other of the back or front portions could just as easily be switched to the other of the back or front portions. For example, the front portion 300 could also or alternatively be manufactured with a mold that supports a mold piece switch-out that enables production of front portions with different lengths. Or, instead of the back piece tucking under the raised rib of the front piece, the relationship could just as easily be reversed. These and other obvious variations are to be considered within the scope of the present invention.

Further, it is to be understood that there are many options for attaching the bed rail cover to the vehicle bed rail. The scope of the present invention is not limited to any one particular attachment option. One option within the scope of the present invention is utilization of 3M double-backed foam tape.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A vehicle bed rail cover comprising:
   a first portion having an end that includes a raised feature; and
   a second portion having an end that is free from raised features wherein the end of the second portion is shaped to be brought together with the end of the first portion.

2. The vehicle bed rail cover of claim 1, wherein each of the first and the second portions includes additional raised features.

3. The vehicle bed rail cover of claim 2, wherein the raised feature and the additional raised features are at least approximately perpendicular to a length of the vehicle bed rail cover.

4. The vehicle bed rail cover of claim 2, wherein the raised feature and the additional raised features are angled relative to a length of the vehicle bed rail cover.

5. The vehicle bed rail cover of claim 1, where the first and the second portions form an inner surface that is configured to accommodate a bed rail of a vehicle.

6. The vehicle bed rail cover of claim 1, wherein the end of the first portion and the end of the second portion include attachment mechanisms that enable the first and the second portions to be securely attached to each other.

7. A vehicle bed rail cover comprising:
   a first portion and a second portion, each portion having an outer surface, each outer surface having a first level and a second level, the second level being raised from the first level, the first portion having at least one end that includes a feature at the raised second level, and the second portion having at least one end that includes a surface at the first level.

8. The vehicle bed rail cover of claim 7, wherein each portion has an inner surface that is configured to accommodate a bed rail of a vehicle.

9. The vehicle bed rail cover of claim 7, wherein the second level includes raised ribs that extend from the first level.

10. The vehicle bed rail cover of claim 7, and further comprising additional portions that are configured to be connected together with the first and the second portions to form the vehicle bed rail cover.

11. The vehicle bed rail cover of claim 7, wherein the second level include a tread pattern.

12. The vehicle bed rail cover of claim 7, wherein an outer perimeter of the vehicle bed rail cover is defined at least in part by a front edge, a rear edge, an inboard edge, and an outboard edge.

13. The vehicle bed rail cover of claim 7, wherein at least one of the vehicle bed rail covers includes a posthole aperture.

14. The vehicle bed rail cover of claim 7, wherein the first and the second portions are made at least in part by utilizing injection molding.

15. A vehicle bed rail cover comprising:
   at least two rail cover portions;
   a raised feature that is configured to conceal a seam formed by joining the at least two rail cover portions.

16. The vehicle bed rail cover of claim 15, wherein the at least two rail cover portions include additional raised features.

17. The vehicle bed rail cover of claim 15, wherein the at least two rail cover portions include a locking mechanism that is configured to securely attach the at least two rail cover portions together.

18. The vehicle bed rail cover of claim 15, wherein the at least two rail cover portions are formed at least in part by utilizing injection molding.

19. The vehicle bed rail cover of claim 15, wherein at least one of the rail covers includes a porthole aperture.

20. The vehicle bed rail cover of claim 15, wherein the raised feature is at an angle.

* * * * *